INVENTOR
SULO A. AIJALA
BY
Barlow & Barlow
ATTORNEYS

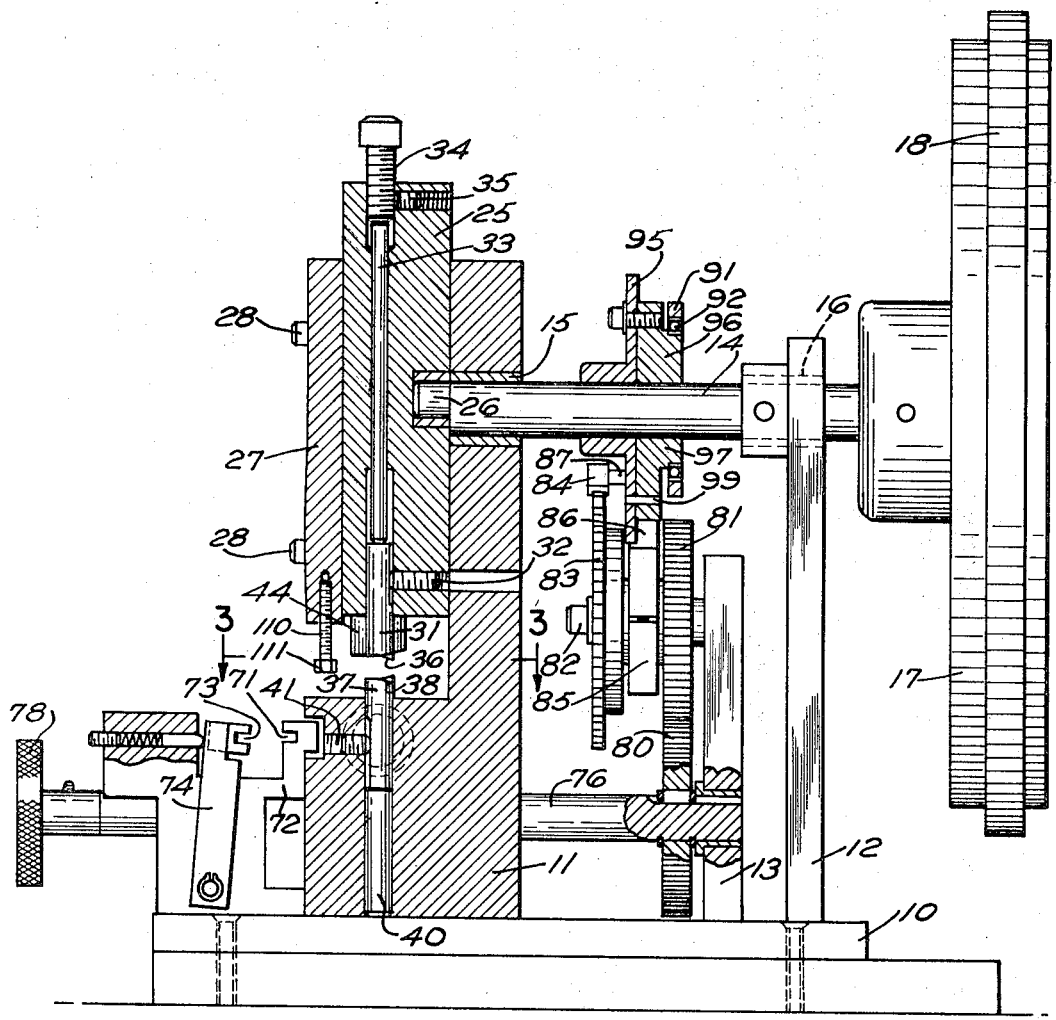
FIG. 2
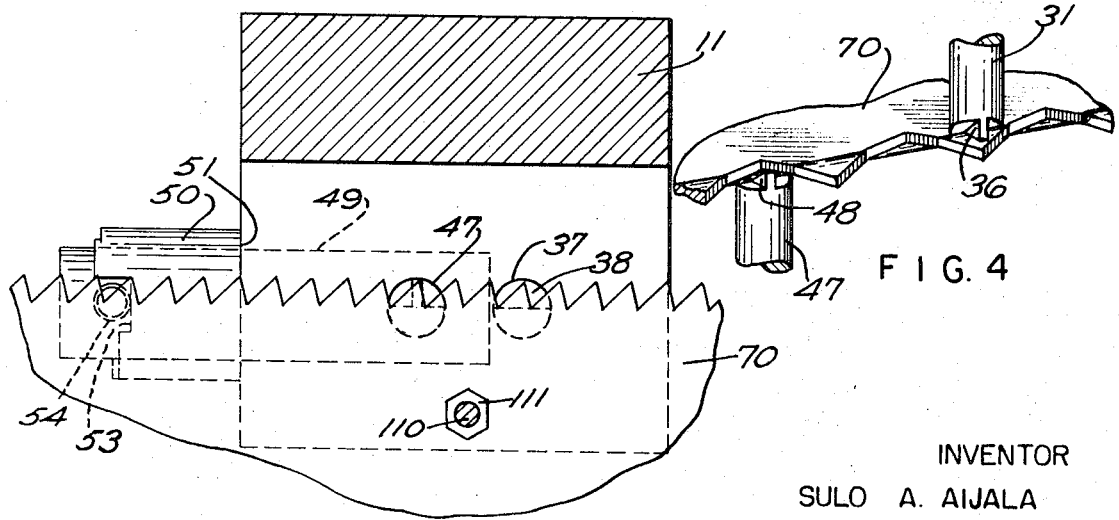
FIG. 3
FIG. 4
INVENTOR
SULO A. AIJALA
BY
*Barlow & Barlow*
ATTORNEYS Feb. 23, 1971   S. A. AIJALA   3,564,941
SAWTOOTH SETTING MACHINE
Filed Sept. 23, 1968   3 Sheets-Sheet 3

INVENTOR
SULO A. AIJALA
BY
Barlow & Barlow
ATTORNEYS

United States Patent Office 3,564,941
Patented Feb. 23, 1971

3,564,941
SAWTOOTH SETTING MACHINE
Sulo A. Aijala, Attleboro, Mass., assignor to Intricate Machine & Engineering Inc., a corporation of Massachusetts
Filed Sept. 23, 1968, Ser. No. 761,500
Int. Cl. B23d 63/04
U.S. Cl. 76—66     3 Claims

ABSTRACT OF THE DISCLOSURE

A machine in which a saw blade is guided and fed in a straight line in a step by step feed with an eccentric on the main drive shaft for operating the feed. The feed is in a straight line, bending tools operate to set a pair of by a relative movement of the parts which are then clamped together in a desired setting. As the saw is feeding a straight line, bending tools operate to set a pair of teeth in opposite directions, one of the bending tools being movable to space it different distances from the other tool for different teeth spacings.

CROSS REFERENCE TO RELATED APPLICATIONS

This application is related to a sawtooth cutting machine, application Ser. No. 761,498, filed Sept. 23, 1968 and to a Sawtooth Sharpening, application Ser. No. 608,579 filed Jan. 11, 1967, now Pat. No. 3,481,224, issued Dec. 2, 1969.

BACKGROUND OF THE INVENTION

In sawtooth setting machines there has been provided some sort of hammers, one operating downwardly and one operating upwardly, alternately to bend the alternate teeth in opposite direction from a blade. This is a cumbersome method.

SUMMARY OF THE INVENTION

The saw blade to be cut is guided through the machine in a straight line path. The feed may be adjusted by means of an adjustable eccentric driven positively from the drive shaft of the machine by a relative setting of two discs, one of which carries the eccentric. Setting tools bend adjacent teeth in opposite directions with the tools relatively adjustable for spacing them differently to accommodate teeth spaced differently by a rotary spacing collar.

DESCRIPTION OF THE DRAWING

FIG. 2 is a sectional view adjacent a bending tool;
FIG. 3 is a sectional view on substantially line 3—3 of FIG. 2;
FIG. 4 is a perspective view of the setting tools and a fragmental portion of a saw.

DESCRIPTION OF THE PREFERRED EMBODIMENT

Figure 1:
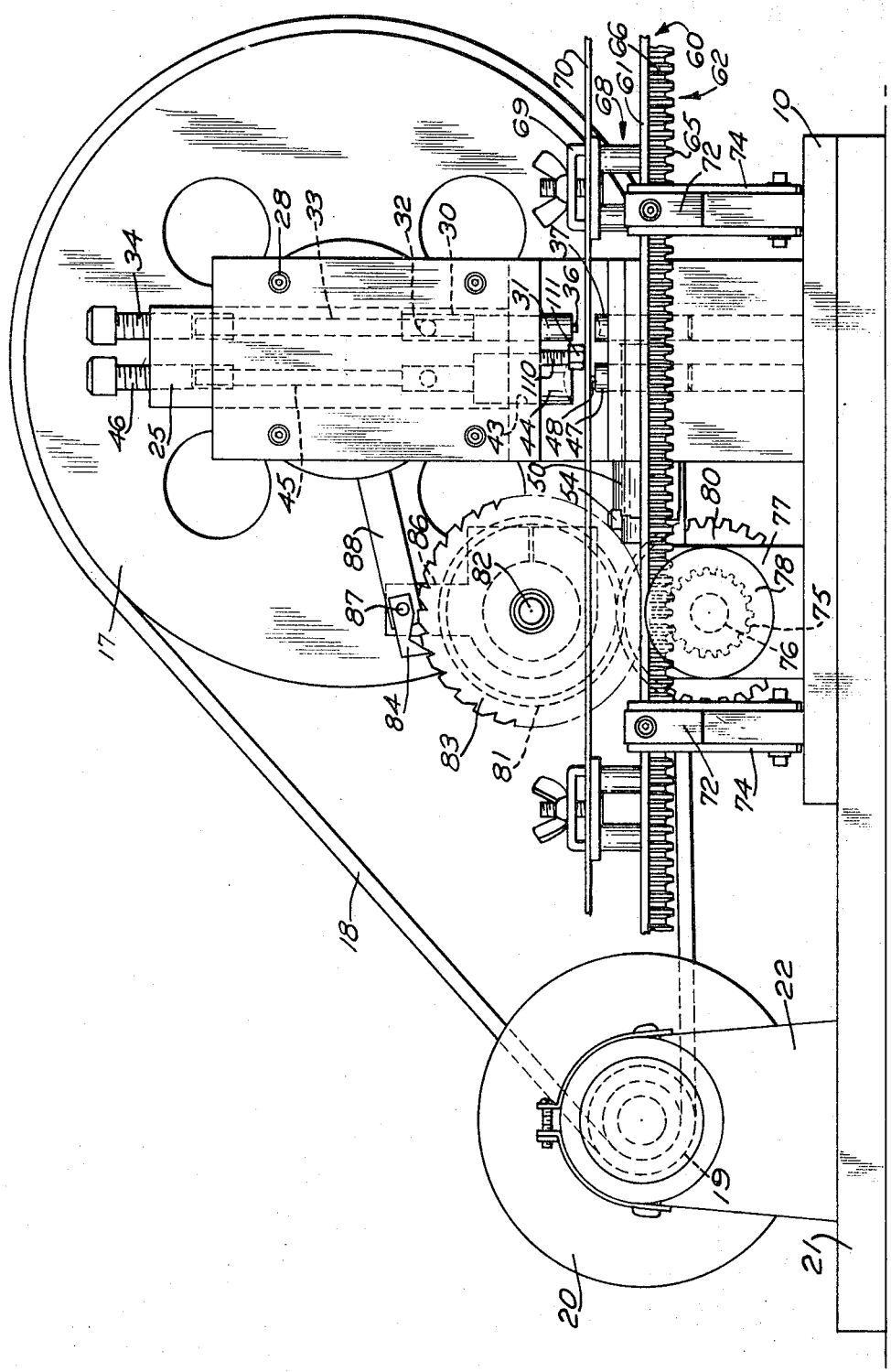
FIG. 1 is an elevation of the machine with the carrier for the saw blade broken away at both ends.

A base 10 mounts upright supports 11 and 12 and 13 as seen in FIG. 2 with a drive shaft 14 having bearings 15 and 16 in the upright supports 11 and 12 which shaft is rotated by pulley 17 driven by belt 18 from pulley 19 (FIG. 1) on motor 20 mounted upon the platform 21 by means of a stand 22.

A plunger 25 is slidably mounted for vertical reciprocation in a guide channel of the suport 11 and is reciprocated by eccentric 26 on the end of shaft 14 in its reciprocating movement. A face plate 27 held on the support 11 by screws 28 closes the guide channel and may be removed for access to the plunger as desired.

In the plunger 25 there are a pair of bores which receive the bending tools. As seen in FIG. 1, there is a bore 30 which receives a tool 31 held in position therein by a set screw 32 and backed up by rod 33 and adjusting screw 34 which is held in place by a set screw 35. This tool is shaped at its lower end with the desired inclination as at 36 so that when it hits one of the two teeth of a saw blade, it will bend that tooth out of the plane of the blade and against the anvil 37 which is cooperatingly shaped as at 38 so as to dispose that tooth in accordance with the set of the tools. This anvil tool is held in position in a bore 39 in the support 11 and is backed up by a support 40 and is also held in position by the set screw 41. By this arrangement when the tool strikes the saw blade tooth, the tooth which it engages will be bent downwardly.

Figure 5:
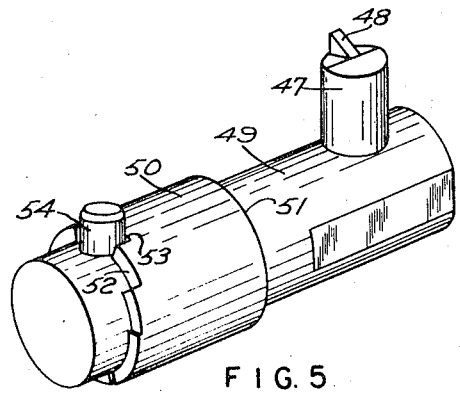
FIG. 5 is a perspective view of the adjustable bending tool.
Figure 6:
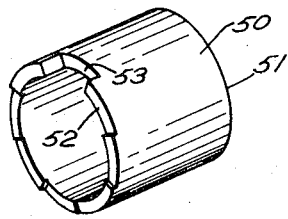
FIG. 6 is a perspective view of the adjusting collar.

A second bore 43 (see FIG. 1) is provided in the plunger 25 and receives a tool 44 similarly held in position by a set screw similar to the set screw 32 and backed up by a rod 45 similar to the rod 33 above described while this rod may be adjustably held by a screw 46 which may also be held in position by a set screw similar to set screw 35. Below this tool 44 there is a tool 47 having an upward projection 48 thereon which cooperates with the tool 44 so that when the tool strikes the saw blade tooth, the tool 48 will bend the tooth upwardly out of the plane of the blade, thus setting it in the opposite direction from the setting of the tool 31, 37 previously described. The tool 47 (see FIG. 5) is on a slidable rod 49 so that it may be moved horizontally toward and from the tools 31, 37 to accommodate teeth having different spacing between them. The tool 47 is held at different locations by sliding the rod 49 horizontally, there being a spacing collar 50 (FIG. 6) having an abutting surface 51 which engages the stand 11 with the other edge of this collar provided with a series of notches 52 having surfaces 53 different distances from the abutting surface 51 so that the pin 54 secured in the rod 49 may engage various surfaces 52 to provide the rod 49 and tool 47 at different distances from the tools 31, 37. Each of these notches carry a number which corresponds to the spacing of the teeth so that when the number of teeth per inch are determined the collar will be rotated to the proper marking for engagement with the pin 54 for the accommodation desired. The width of the tool 44 is sufficient so that it will accommodate the tool 48 at its various locations of adjustment. Thus it is shown of a greater diameter than the tool 31. A saw blade carrier designated generally 60 comprises a bar 61 (see FIGS. 1 and 3) with a rack designated generally 62 located beneath this bar and adjustable relative to the bar by means of a hand wheel and threaded shaft shown in my companion case. This rack has teeth 65 on its lower edge and also rack teeth 66 on its side edge so that the saw carrier may be moved from the setting machine to a sharpening machine without removing the blade from the carrier. The sharpening machine is set forth in greater detail in my application Ser. No. 608,579 filed Jan. 11, 1967. Mounted upon this bar 61 there are a plurality of blade mounting devices designated generally 68 and comprising clamps 69 to hold a blade 70 in position. The bar 61 is guided in slots 71 in upright 72 (see FIG. 2) and in slots 73 in arms 74 which are urged toward slot 71 by pins pressed by means of springs which may be adjusted as to tension by set screws. By this arrangement the saw blade is maintained in substantially a horizontal plane and slidably guided in this plane and in the same rectilinear path supported adjacent the teeth on the setting tools during the operation of the setting tools. The tools operate to set two teeth each downward stroke of the plunger 25, one tooth downward and one tooth upward. The tools act on teeth spaced apart by two teeth not operated upon as seen in FIGS. 3 and 4 and the saw is advanced or fed the distance of two teeth each step feed of the machine.

The rack teeth 65 mesh with a gear 75 (FIG. 1) on shaft 76 mounted in standard 77 and 13 (FIG. 2) in suitable bearings. A handle 78 on the end of this shaft 76 at the front of the machine serves to rotate the gear 75 for rapidly moving the carriage to the desired location.

Figure 7:
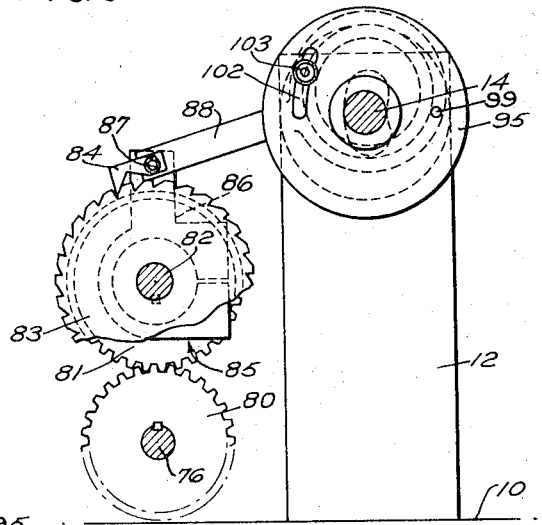
FIG. 7 is an elevation of the feeding portion of the machine.
Figure 8:
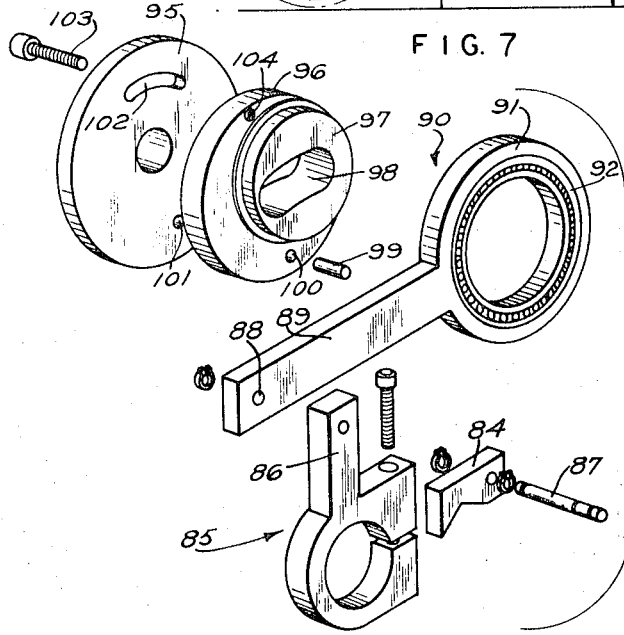
FIG. 8 is an exploded view in perspective of the various parts of the feeding mechanism.

Shaft 76 and its gear 75 are mechanically fed by means of gear 80 keyed to shaft 76 and change gear 81 rotatably mounted on the upright support 13 on shaft 82 which carries a ratchet wheel 83. The pawl for operating ratchet wheel 83 is designated 84 and is pivotally mounted on yoke 85 by pin 87 (see FIGS. 7 and 8). This yoke rockably embraces the shaft 82 and has an arm 86 extending generally radially and pivotally mounts pawl 84 by which pin also pivotally connects arm 86 to opening 88 of member 90 having an eccentric embracing loop 91 equipped with a ball bearing 92.

This pawl 84 is reciprocated from drive shaft 14 by means of a disc 95 coupled to a disc 96 carrying an eccentric 97. A slot 98 enables the two discs 95 and 96 to be relatively positioned to adjust the position of the eccentric with reference to the shaft 14 upon which the discs are monuted so as to adjust the throw of the eccentric which operates in the loop 91 and ball bearing 92. These discs may be moved one on the other about pivot pin 99 which connects them and extends through hole 100 is disc 96 and hole 101 is disc 95. The disc 95 is slotted as at 102 and a threaded screw 103 passing thru slot 102 and into threaded opening 104 serves to bind the two parts together when adjusted to the desired position about the pivot pin 99. Thus the longitudinal motion of the pawl may be varied by relatively adjusting the discs 95 and 96 which makes for a very simple arrangement of adjustment.

A bolt 110 threaded into the lower end of the face plate 27 serves as a guide by means of its head 111 which engages the blade 70 to keep the blade against the bending tools as the plunger is operating.

I claim:

1. In a sawtooth setting machine, means for supporting and feeding a saw blade with teeth therein, means for setting two teeth of a saw blade simultaneously in opposite direction from the plane of the blade by a movement in one direction comprising two sets of tools each set having a part operable from one side of the plane of the blade and a part operable from the other side of the plane of the blade and means for relatively moving said tools toward and from each other to accommodate different spacings of the teeth of saw blades.

2. A sawtooth setting machine as in claim 1 wherein the last said means comprise a carrier for the part of one set of tools slidably mounted to move toward or from the other set.

3. A sawtooth setting machine as in claim 2 wherein said carrier has a cylindrical portion and a spacing collar embracing said cylindrical portion and notched different depths from one edge thereof and serving to position said carrier different distances from the other set.

References Cited
UNITED STATES PATENTS 1,569,023    1/1926    Koch et al. _____ 76—66

BERNARD STICKNEY, Primary Examiner